US011134062B1

(12) United States Patent
Ogrinz et al.

(10) Patent No.: US 11,134,062 B1
(45) Date of Patent: Sep. 28, 2021

(54) ISOLATING AND DISABLING UNAUTHORIZED APPLICATIONS

(71) Applicant: Bank of America Corporation, Charlotte, NC (US)

(72) Inventors: Michael Ogrinz, Easton, CT (US); Varadharajan Candhadai Ramaswamy, Irving, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/899,657

(22) Filed: Jun. 12, 2020

(51) Int. Cl.
*H04L 29/06* (2006.01)
*H04L 29/08* (2006.01)

(52) U.S. Cl.
CPC ...... *H04L 63/0281* (2013.01); *H04L 63/0236* (2013.01); *H04L 63/08* (2013.01); *H04L 63/0876* (2013.01); *H04L 63/1425* (2013.01); *H04L 67/02* (2013.01); *H04L 67/42* (2013.01)

(58) Field of Classification Search
CPC . H04L 63/0236; H04L 63/0281; H04L 63/08; H04L 63/0876; H04L 63/1425; H04L 67/02; H04L 67/42
See application file for complete search history.

(56) References Cited

U.S. PATENT DOCUMENTS

| 7,178,051 | B2 | 2/2007 | Barr et al. |
|---|---|---|---|
| 7,191,356 | B2 | 3/2007 | Barr et al. |
| 7,237,138 | B2 | 6/2007 | Greenwald et al. |
| 7,602,704 | B2 | 10/2009 | Shaffer et al. |
| 9,122,595 | B2 | 9/2015 | Parra et al. |
| 9,488,689 | B2 | 11/2016 | Dougherty |
| 9,824,000 | B1 | 11/2017 | Babcock |
| 9,842,045 | B2 | 12/2017 | Heorhiadi et al. |
| 9,934,105 | B2 | 4/2018 | Parra et al. |
| 10,162,708 | B2 | 12/2018 | Parra et al. |
| 10,255,129 | B2 | 4/2019 | Jiang et al. |

(Continued)

OTHER PUBLICATIONS

"Proxy Server Logs for Incident Response," https://www.vanimpe.eu/2016/10/21/proxy-server-logs-incident-response/, Oct. 21, 2016.

*Primary Examiner* — Gil H. Lee
(74) *Attorney, Agent, or Firm* — Weiss & Arons LLP; Michael A. Springs, Esq.

(57) ABSTRACT

Typically, a business desires to track and monitor all applications run on its servers. Nonetheless, one or more unauthorized applications may be running on the business's servers, exposing the business to potential regulatory liability and security breaches. Apparatus and methods are provided for isolating and disabling one or more unauthorized applications running on a server. The apparatus may comprise a system including a content-filtering web proxy server configured to filter outgoing requests and data associated with the requests. The system may also include a remediation framework configured to monitor request data in a proxy log stored by the proxy server. The remediation framework may be triggered to perform remedial action when the remediation framework determines that a request and associated data, as stored in the proxy log, meets predetermined conditions. The remediation framework, when triggered, may execute steps to truncate functionality of the unauthorized applications.

20 Claims, 9 Drawing Sheets

(56) References Cited

U.S. PATENT DOCUMENTS

| | | | |
|---|---|---|---|
| 2005/0028010 A1* | 2/2005 | Wallman | H04L 63/1458 726/4 |
| 2008/0065746 A1* | 3/2008 | Moghaddam | H04L 63/0245 709/220 |
| 2019/0171552 A1 | 6/2019 | Mitchell et al. | |

* cited by examiner

TOP APIS — 707

Show [10 ▼] entries                                    [30 Days ▼]  Show interna — 713
                                                       Search: [          ]
                                              709 — URL — 711

| Host ▲ | Category | URL | Total Bytes in ▼ | Total Bytes Out |
|---|---|---|---|---|
| 55 — 705 | Finance News | api.morningstar.com | 38,436.09 MB | 4,553.44 MB |
| 4 | Business/Economy | api.pjm.com | 10,679.74 MB | 26.44 MB |
| 3 | Business/Economy | misapi.ercot.com | 8,479.74 MB | 7,658.7 MB |
| 10 | Technology/Internet | dev.virtualearth.net | 4,578.86 MB | 459.65 MB |
| 69 | Technology/Internet | api.devicecheck.apple.com | 4,382.58 MB | 57,341.13 MB |
| 4 | Business/Economy | api.misoenergy.org | 3,132.77 MB | 64.5 MB |
| 34 | Finance | api.donorfirstx.com | 1,153.58 MB | 416.09 MB |
| 1 | Technology/Internet | api.kennasecurity.com | 1,150.2 MB | 23.1 MB |
| 71 | Business/Economy; File Storage/Sharing | api.intralinks.com | 845.23 MB | 3.53 MB |
| 7 | Social Networking | api.twitter.com | 390.09 MB | 64.88 MB |

| Host | Score | User(s) | User Agents | Usage comments | MB received | Environment | MB sent | Internal Identification Number | App Owner |
|---|---|---|---|---|---|---|---|---|---|
| | 805 | 807 | 809 | 811 | 813 | 815 | 817 | 819 | 821 |
| AID Online | | | | | | | | | |
| 209.67.48.4 | 5 | zs3fy8l | | | 74.74 MB | Production | 8.14 MB | 70680 | John Doe |
| 216.35.133.133 | 5 | zs3fy8l | | | 69.53 MB | Production | 7.96 MB | 70680 | Karew Way |
| 216.35.62.140 | 5 | zs3fy8l | | | 1,221.34 MB | Production | 128.73MB | 23168, 25872, 27814, 38764, 41788, 94173 | Anne Way, John Xie |

API STATS
API.MORNINGSTAR.COM
Show 803 10 entries
Search:
829

ISOLATING AND DISABLING UNAUTHORIZED APPLICATIONS

FIELD OF TECHNOLOGY

Servers typically run one, two or more applications. To provide reliable operation of the server, technicians must ensure that each application run on the server complies with technical, regulatory and business requirements. Companies, therefore, typically invest considerable time and resources in technical support services to maintain the multiple applications supported by their software and running on their servers.

Despite a technician's best efforts, however, non-compliant applications may be found running on the company's servers. Such applications may not be pre-vetted by technicians maintaining the company's servers and may therefore not be registered in the company's central directory of known, vetted applications that comply with the company's security and technical requirements.

Such unauthorized applications, also known as "shadow IT", may be deployed on a company's servers without the company's awareness of their presence. These non-compliant applications may be deployed on a company's server by a programmer as a shortcut to circumvent governance controls, or with malicious intent to breach the company's security protocol. Unauthorized applications can cause multiple hardships to a company, including inability to provide proper oversight, exposure to liability for noncompliance with government or internal rules and regulations, security breaches and unreliable services. End-users of "shadow IT" applications may not realize they are unsupported and/or potentially unstable. This could lead to unplanned business interruptions or other consequences if the application has not been properly audited before deployment.

It would be desirable to provide apparatus and methods for isolating and disabling unauthorized applications to improve reliability and security of the company's computer servers and associated software applications. Accordingly, it would be desirable to provide apparatus and methods for ISOLATING AND DISABLING UNAUTHORIZED APPLICATIONS.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 7 shows an illustrative graphical user interface in accordance with principles of the disclosure;

FIG. 8 shows an illustrative graphical user interface in accordance with principles of the disclosure.

DETAILED DESCRIPTION

Figure 1:
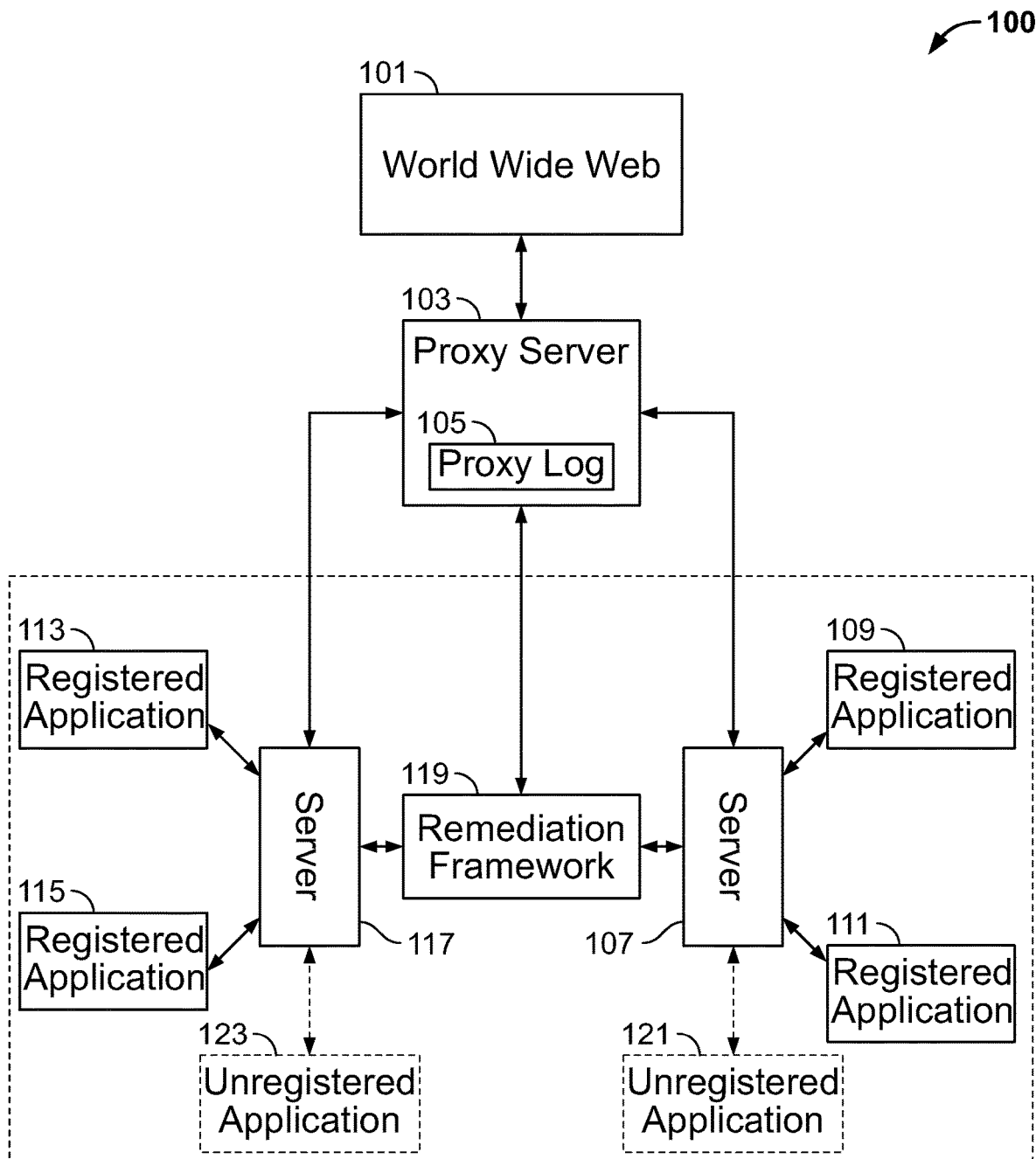
FIG. 1 shows illustrative system architecture in accordance with principles of the disclosure.

Apparatus and methods for isolating and disabling unauthorized applications is provided. The isolating may include quarantining the unauthorized applications. The disabling may include quarantining the unauthorized applications.

The apparatus may include a system. The system may identify and quarantine shadow information technology ("IT"). The shadow IT may comprise one or more unauthorized applications running on a server.

The system may include a proxy server. The proxy server may be a web proxy server. The proxy server may filter content passing through the proxy to and from the internet. The proxy server is referred to alternately herein as a content filtering web proxy server, however, it is to be understood that any suitable proxy server may be used.

The proxy server may be configured to filter outgoing requests and data associated with the requests. The requests may be calls. The requests may be received from one or more client servers. The requests may be received from one or more web browsers. The requests may be received from one or more applications. The requests may use the Hypertext Transfer Protocol ("HTTP"). The requests may use other stateless or stateful protocols, or a plurality of protocols. Although the requests are referred to alternately herein as 'HTTP requests', it is to be understood that any other suitable protocol may be used.

The proxy server may store, in the proxy log, data associated with the request. Exemplary data that may be stored by the proxy log, and associated with a request, includes one or more of a data and time that the request was received, request method, such as HTTP request method, protocol version, such as HTTP protocol version, user agent, content type, requested resource, time needed to provide a reply, size of data transmitted by the request, and any other suitable data.

The proxy server may also store, in the proxy log, data associated with data packets being transmitted from the internet to a destination within a company's servers, the data including size of data transmitted, destination address, protocol version, and any other suitable data.

The system may include a remediation framework. The remediation framework may be configured to monitor data in the proxy log stored by the proxy server. The remediation framework may be triggered to perform remedial action. The remediation framework may be triggered when one or more conditions are satisfied by an HTTP request and/or data associated with the HTTP requests.

The remediation framework may monitor data stored by the proxy log to determine if the one or more conditions are satisfied. The remediation framework may periodically, continually or upon the lapse of a predetermined time period, monitor the data. The remediation framework may monitor data in the proxy log each time a new entry is created. The remediation framework may monitor data in the proxy log each time a new entry is updated. The monitoring may include assigning weights to a request when predefine condition(s) are satisfied.

The remediation framework may monitor data stored by the proxy log to identify requests originating from programs, on a company's servers, that are calling application programming interfaces ("APIs") on the internet.

The remediation framework may review data stored by the proxy log to identify an unregistered application running on a production server. The remediation framework may be triggered when weight(s) assigned to an HTTP request is above a threshold value. The assigning of weights to the request, which may include a first, second, third, fourth, fifth weight, and potentially a sixth, seventh and/or eight weight, is discussed in detail below.

The remediation framework may not be triggered to perform remedial action for an HTTP request when it is determined that the request is being generated by an end user. For example, when the assigned weight is below a threshold value for a request, the remediation framework may terminate the review of the request and move on to the monitoring of a different request.

In exemplary embodiments, the remediation framework may be triggered when the remediation framework determines that a HTTP request and associated data, as stored in the proxy log, satisfies one, two, three, four, five, or all, of the following conditions: the HTTP request includes predefined term (such as an IP address, included in the HTTP request, includes the predefined term); is identified as originating from a production server; is associated with an account ID that identifies a service account; is either associated with a user agent that identifies a program or is not associated with any user name; is associated with an identification number that, in a central registry, identifies a production application; and the IP address is tagged as anomalous in response to querying stored information associated with the identification number.

The remediation framework, when triggered, may send a notification to one or more e-mail addresses of technician(s) associated with the production server. The technician(s) and technician contact information may be stored in a company directory identifying production servers and, for each server, associated technician(s) and technician information.

The remediation framework may send the notification when the remediation framework determines that the HTTP request and associated data: includes an IP address listing a predefined term; is identified as originating from a production server; is associated with an account ID that identifies a service account; is either associated with a user agent that identifies a program or is not associated with any user name; and is associated with an identification number that, in a central registry, identifies a production application. Sending the notification to the technician may be performed instead of determining whether or not to tag the IP address as anomalous.

The notification may include a query identifying the HTTP request. The notification may include a first selectable icon and a second selectable icon. An exemplary first selectable icon may include text such as "known traffic" and an exemplary second selectable icon may include text such as "unknown traffic."

The first selectable icon, when selected, may inform the remediation framework that the HTTP request is known to the technician. When the first selectable icon is selected, the remediation framework may terminate the review of the HTTP request. When the first selectable icon is selected, the remediation framework may store data relating to the HTTP request so that, in the future, a similar or identical HTTP request will not trigger remedial action by the remediation framework. Storing data associating the HTTP request may circumvent the remediation framework reviewing the HTTP request to determine if the HTTP request and associated data has one or more characteristics as described above.

The second selectable icon, when selected, may inform the remediation framework that the HTTP request is unknown to the technician. In response, the remediation framework may be triggered to perform remedial action described herein.

In some embodiments, the remediation framework may determine if the IP address is anomalous. The remediation framework may determine if the IP address is anomalous by querying stored information associated with the identification number. For example, the central registry may store data identifying one or more external APIs that a registered application associated with an identification number will access. When the central registry includes stored data identifying allowed external API calls for a registered application, the remediation framework may, for each HTTP request, access the central registry and filter all registered external APIs that are associated with the identification number. The filtering may be used by the remediation framework to determine whether or not to tag the IP address as anomalous. If the HTTP request is associated with a registered external API, the remediation framework may not tag the IP address as anomalous and terminate its review of the HTTP request. In some embodiments, the remediation framework may automatically block any traffic to an external API that is not pre-registered, in the central registry, as associated with the traffic's identification number.

In some embodiments, the remediation framework may tag the IP address as anomalous when the identification number is associated with registered external APIs and the HTTP request is not accessing one of the registered APIs. In some embodiments, when the identification number is not associated with any registered external APIs, the remediation framework may tag the IP address as anomalous.

In some embodiments, the remediation framework may store historical activity of HTTP requests generated by a server, and/or historical activity of an application identified by an identification number. The remediation framework may then compare a newly-generated HTTP request to the historical data to flag any new traffic that is different from the traffic stored in the historical activity. The remediation framework may tag the IP address as anomalous if the HTTP request is determined to be different from the historical HTTP requests associated with the identification number.

Tagging the IP address as anomalous may include tagging a term in the IP address as anomalous. For example, if the IP address includes one or more predetermined terms stored by the remediation framework, the remediation framework may tag the term in the IP address as anomalous. The predetermined terms may include terms identifying APIs that should not be accessed by production servers, such as, for example, 'YouTube', and one or more terms that indicate that the API is associated with inappropriate, violent, or otherwise undesirable subject matter.

The remediation framework, when triggered, may accesses the production server from which the HTTP request originated. The remediation framework may identify the production server from which the HTTP request originated by extracting origination data from the HTTP request, the origination data identifying the production server.

The remediation framework, when triggered, may query a directory to identify one or more authorized applications running on the production server. The remediation framework, when triggered, may quarantine one or more unauthorized applications running on the production server. The quarantining may be achieved by moving each of the identified authorized applications from the production server to a replacement server. After the quarantining the production server may be altered to be, or renamed as, a modified production server.

The remediation framework, when triggered, may create a shadow account. The shadow account may support electronic receipt and storage of data. The shadow account may accumulate, and store, third-party data requested by the modified production server. The shadow account may accumulate, and store, third-party data pushed to the modified production server.

The remediation framework, when triggered, may instruct the proxy server to take remedial action. Some or all of the steps executed by the proxy server, when implementing the remedial action, may be in response to instructions received from the remediation framework.

The proxy server may be configured to implement the remedial action by terminating all third-party data transmission to the modified production server.

The proxy server may be configured to implement the remedial action by redirecting to the shadow account all received third-party data directed to the modified production server. Exemplary received third-party data may include data transmitted to the proxy server, from the internet, directed to the modified production server.

The proxy server may be configured to implement the remedial action by, in response to receiving a new HTTP request from the modified production server, forwarding a copy of the HTTP request to the shadow account. In response to receipt of the new HTTP request, the proxy server may execute the new HTTP request. When a response to the new HTTP request is received, by the proxy server, the proxy server may, in some embodiments, link the response to the new HTTP request. The proxy server may transmit the response and the new HTTP request to the shadow account.

The remediation framework may be configured to review data stored in the shadow account for predetermined terms, content or information. In the event that the remediation framework identifies predetermined terms, content or information, in the shadow account, associated with sensitive, unauthorized, or harmful data, the remediation framework may shut down the modified production server to fully disable all activities executed by the modified production server.

Review of the shadow account by a technician may provide a holistic view of requests that the unauthorized applications are attempting to make, and data that is being sent, by third-party applications on the internet, to the unauthorized applications.

Completion, by the proxy server, of the remedial action may truncate functionality of the one or more unauthorized applications running on the modified production server. The truncated functionality may be functionality that relies on receipt of third-party data and/or transmission of data to one or more third parties.

As set forth above, the HTTP request may be associated with an identification number that, in a central registry, identifies a production application. The identification number may be associated with one or more registered applications. The registered applications may be known applications, vetted by a company, that are running on a company server.

Using contact information from the central registry, the remediation framework may attempt to associate the HTTP request with the one or more registered applications. If the remediation framework cannot associate the HTTP request with the one or more registered applications using methods described herein, the HTTP request may be determined by the system to have been generated by an unregistered application ("Shadow IT") and, therefore, subject to possible restrictions or quarantine, such as the restrictions or quarantine detailed herein.

In some of these embodiments, the remediation framework, when triggered, may, instead of, or in addition to, accessing the production server, query a directory to identify one or more authorized applications associated with the identification number. The remediation framework may then quarantine one or more unauthorized applications associated with the identification number by assigning each of the authorized applications to a new identification number. Now, any traffic being through the proxy server that is associated the identification number may be handled as unauthorized application traffic and re-directed to a shadow account as described above.

In some of these embodiments, the remediation framework may instruct the proxy server to block all HTTP requests associated with the identification number.

In some of these embodiments, the remediation framework may create a shadow account for accumulating third-party data requested by an HTTP request associated with the identification number. The shadow account may also accumulate third-party data pushed to a destination address associated with the identification number. The remediation framework may instruct the proxy server to take remedial action. The proxy server may be configured to implement the remedial action by one or more of: terminating all third-party data transmission to a destination address associated with the identification number; redirecting to the shadow account all received third-party data directed to a destination address associated with the identification number; in response to receiving a new HTTP request associated with the identification number, forwarding a copy of the HTTP request to the shadow account; executing the new HTTP request; and when a response to the new HTTP request is received, linking the response to the new HTTP request and transmitting the response and the new HTTP request to the shadow account. Completion, by the proxy server, of the remedial action may truncate functionality of the one or more unauthorized applications associated with the identification number.

The proxy server may be further configured to implement the remedial action by applying a dynamic filter to data the modified production server attempts to transmit to a third-party. The applying the dynamic filter may include receiving data from the modified production server for being transmitted to an IP address. The applying the dynamic filter may include filtering the data for sensitive information. When the data is determined to contain sensitive information, the proxy server may be configured to transmit the data to the shadow account and transmit instructions to the remediation framework to shut down the modified production server.

The dynamic filter may also include the proxy server receiving data from the modified production server for being transmitted to an IP address. If a size of the data is determined, by the proxy filter, to be greater than a predetermined size, the dynamic filter may also include transmitting the data to the shadow account and/or transmitting instructions to the remediation framework to shut down the modified production server.

When the dynamic filter is a first dynamic filter, the proxy server may be further configured to implement the remedial action by applying a second dynamic filter to third-party data transmitted to the modified production server. The second dynamic filter may include the proxy server receiving data from an IP address for transmission to the modified production server. If a size of the data is determined, by the proxy server, to be greater than a predetermined size, the second dynamic filter may include transmitting the data to the shadow account and/or transmitting instructions to the remediation framework to shut down the modified production server.

The monitoring performed by the remediation framework of the proxy log may include the remediation framework assigning one or more weights to each HTTP request. The assigning weights may include calculating a value for each HTTP request stored in the proxy log. A first weight, second weight, third weight, fourth weight, fifth weight and, in some embodiments, a sixth weight, seventh weight and/or eight weight, may be assigned to an HTTP request if the HTTP requests is determined, by the remediation framework, to fulfill predetermined requirement(s) associated with each of the weights, as detailed below.

The monitoring may include the remediation framework assigning a first weight to each HTTP request if the HTTP request, in the proxy log, requests to access an IP address including a predefined term. The predefined term may be "API".

In some embodiments, the remediation framework, upon identification of the predefined term, may query a list to determine if the IP address, or a term in the IP address, is associated with a company or service for which a contract is in place to allow usage of the API. If a contract exists, monitoring of the API for the HTTP request may be truncated, and the remediation framework may not be triggered for the HTTP request.

The monitoring may include the remediation framework accessing contents of each HTTP request. For each HTTP request, the remediation framework may perform pattern recognition on the contents to identify conformance of the content to a predetermined protocol. Exemplary protocol may be API protocol. In some embodiments, the remediation framework may perform pattern recognition to identify conformance with one or more of XML protocol, j son protocol, SOAP protocol, and HTML.

If the contents are determined, by the remediation framework, to conform to one of XML protocol, j son protocol, SOAP protocol, the monitoring may include assigning a sixth weight to the associated HTTP request.

If the contents are determined, by the remediation framework, to conform to HTML, the monitoring may include not assigning the first weight or the sixth weight to the associated HTTP request.

The monitoring may include the remediation framework assigning a second weight to each HTTP request if the HTTP request, in the proxy log, is identified as originating from a production server. An HTTP request may be identified as originating from a production server if an origination address of the request identifies a production server. Data identifying the server as a production server, or as a server different from a production server, may be stored in the proxy log.

The monitoring may include the remediation framework assigning a third weight to each HTTP request if the HTTP request, in the proxy log, is associated with an account ID that identifies a service account. The remediation framework may query a company directory to determine whether or not the account ID identifies a service account. A service account may be an account that is not associated with an end user or a web browser.

The monitoring may include the remediation framework determining if the HTTP request, in the proxy log, is associated with an account ID that identifies a web browser. The monitoring may include the remediation framework not assigning the third weight to the HTTP request when the HTTP request, in the proxy log, is associated with an account ID that identifies a web browser.

The monitoring may include the remediation framework assigning a fourth weight to each HTTP request if the HTTP request, in the proxy log, is either associated with a user agent that identifies a program or is not associated with any user name.

The monitoring may include the remediation framework determining if the HTTP request, in the proxy log, is associated with a user agent that identifies a browser. The monitoring may include the remediation framework not assigning the fourth weight to the HTTP request if the HTTP request, in the proxy log, is associated with a user agent that identifies a browser. For example, if the HTTP request includes data identifying a web browser, such as the term 'Mozilla', 'Chrome', 'AppleWebKit', 'Firebox', 'Gecko', or any other term identifying a web browser, the fourth weight may not be assigned to the HTTP request.

The monitoring may include the remediation framework using pattern recognition to determine if the HTTP request, in the proxy log, is associated with a user agent that conforms to Java™ or C sharp programming protocol. The monitoring may include the remediation framework assigning the fourth weight to the HTTP request if the HTTP request, in the proxy log, is associated with a user agent that conforms to, or includes, Java™ or C sharp programming protocol.

The monitoring may include the remediation framework assigning a fifth weight to each HTTP request if the HTTP request, in the proxy log, is associated with an identification number that identifies a production application. The identification number may be associated with the HTTP request in a central registry. The central registry may be used, by technicians, to store identification data of all authorized applications running on one or more company servers.

In some embodiments, each identification number may be associated with an identified server. Additionally, each identification number may be associated with one or more technicians and/or employees, each fulfilling a role in one or more of the creation, maintenance and support application(s) associated with the identification number.

In some embodiments, an identification number may be associated with a single application. In some embodiments, an identification number may be associated with two or more applications.

A server may run application(s) associated with one identification number. A server may run application(s) associated with two or more identification numbers.

In some embodiments, the monitoring may include the remediation framework assigning a seventh weight to an HTTP request when a size of data being transmitted through the proxy server is greater than a predetermined size.

In some embodiments, the monitoring may include the remediation framework assigning an eighth weight to an HTTP request if a category associated with the HTTP request, in the proxy server, is included in a complied list of categories stored by the proxy server. The categories may be identified as 'high-risk' categories. The category may be assigned to the HTTP request by the proxy server. The category may be selected from a directory of categories that can potentially be assigned to an HTTP request that is stored by the proxy server.

The remediation framework may tally the weights assigned to each HTTP request. The weights may be one, some, or all of the first, second, third, fourth, fifth, sixth, seventh, and eight weights detailed above, or any other suitable weight that may be assigned to an HTTP request. Additional weights, values, and scaling factors may be used by the remediation framework to calculate a final value of the tallied weight of each HTTP request.

When the tallied weight for one of the HTTP requests is above a threshold value, the remediation framework may be triggered for the one of the HTTP requests. When the tallied weight is below the threshold value, the remediation framework may take no action.

When the tallied weight for one of the HTTP requests is above a threshold value, and, in some embodiments, when the IP address is tagged as anomalous, the remediation framework may be triggered for the one of the HTTP requests. When the tallied weight is below the threshold value, and, in some embodiments, when the IP address is not tagged as anomalous, the remediation framework may take no action.

The tallied weight of the one of the HTTP requests may be above the threshold value when the one of the HTTP requests: includes an IP address listing a predefined term; is identified as originating from a production server; is associated with an account ID that identifies a service account; is either associated with a user agent that identifies a program or is not associated with any user name; and is associated with an identification number that, in a central registry, identifies a production application.

The monitoring may include the remediation framework aggregating HTTP requests transmitted to an IP address over a time period. The monitoring may include the remediation framework identifying a time lapse between each of the HTTP requests transmitted to the IP address over the time period. The monitoring may include the remediation framework being triggered when the time lapse is determined to be a constant value between each of the HTTP requests transmitted to the IP address over the time period. Time lapses between requests may be determined to be a 'constant value' when the time lapses are equivalent down to the minute, second, millisecond, or any other suitable time measurement. Such equivalence may strongly indicate that these requests are being generated by applications and not a human.

The remediation framework may be triggered by assigning an additional weight to the HTTP request that will bring the tallied weight over the threshold value. The remediation framework may be triggered independent of whether or not the tallied weight of the HTTP request is above or below the threshold value.

The monitoring may include aggregating HTTP requests by company. For example, all HTTP requests sent to a Google™ API may be aggregated. These requests may then be reviewed during a time period for requests having a constant time lapse.

In some embodiments, the remediation framework, when triggered, may determine if the production server is assigned to a first tier of importance or a second tier of importance.

The first tier of importance may include a first permitted downtime. The second tier of importance may include a second permitted downtime. The second permitted downtime may be longer than the first permitted downtime. The first permitted downtime may be less than a threshold value. The second permitted downtime may be greater than a threshold value. The remediation framework may determine that a production server is assigned to the first tier of importance if the production server is associated with a permitted downtime that is less than the threshold value. The remediation framework may determine that a production server is assigned to the second tier of importance if the production server is associated with a permitted downtime that is greater than the threshold value.

The first tier of importance may correspond to a first hierarchical placement, in a company, of the one or more web application(s) supported by a first production server. The second tier of importance may correspond to a second hierarchical placement, in a company, of the one or more web application(s) supported by a second production server. The first hierarchical placement may be relatively more important, based on the hierarchy, than the second hierarchical placement. A cut-off, or threshold, hierarchical placement may be used by the remediation framework to determine if a production server is to be assigned to the first tier or importance or the second tier of importance.

In some of these embodiments, when the production server is determined to be assigned to a first tier of importance, the production server may be configured to instruct the proxy server to increase monitoring of data being sent to, and received from, the production server.

The proxy server may be configured to increase monitoring of data being sent to, and received from, the production server in response to receipt of instructions from the remediation framework. In addition to the proxy server, other network components such as switches, gateways, etc., and servers, such as databases, applications, workflows, etc., may be part of the network topology or application architecture. One or more of the aforementioned components may be instructed, by the proxy server and/or by the remediation framework, to perform additional monitoring when suspected unauthorized use of resources has been identified.

In some of these embodiments, when the production server is determined to be assigned to a second tier of importance, the second tier of importance being less than the first tier of importance, the remediation framework may be configured to execute remedial action detailed above. The remedial action may include one or more of the accessing the production server from which the HTTP request originated; the querying a directory to identify one or more authorized applications running on the production server; the quarantining one or more unauthorized applications running on the production server; the creating a shadow account for accumulating third-party data requested by the modified production server and accumulating third-party data pushed to the modified production server, and the instructing the proxy server to take remedial action, and any other additional or alternative remedial action described above or herein.

When the production server is determined to be assigned to the second tier of importance, the proxy server may be configured to implement proxy-server-remedial-action detailed above. The remedial action may include one or more of the terminating all third-party data transmission to the modified production server; the redirecting to the shadow account all received third-party data directed to the modified production server; the, in response to receiving a new HTTP request from the modified production server, forwarding a copy of the HTTP request to the shadow account, the executing the new HTTP request; and, when a response to the new HTTP request is received, the linking the response to the new HTTP request and transmitting the response and the new HTTP request to the shadow account, and any other additional or alternative remedial action described above or herein. As detailed above, completion, by the proxy server, of the remedial action may truncate functionality of the one or more unauthorized applications running on the modified production server.

When the production server is determined, by the remediation framework, to be assigned to the first tier of importance, the remediation framework may be further configured to instruct the proxy server to: continually monitor a size of outgoing traffic from the production server for a data extrusion event; and in response to detection of the data extrusion event, shut down the production server.

The proxy server, in response to receipt of the instructions from the production server, may be configured to continually monitor the size of outgoing traffic from the production server for the data extrusion event and shut down the production server in response to determining that a size of outgoing traffic is greater than a predetermined threshold. The determination, by the proxy server, that a size of outgoing traffic is greater than the predetermined threshold may identify the data extrusion event.

The apparatus and methods may include methods for quarantining shadow IT. The methods may include filtering, using a content-filtering web proxy server, outgoing HTTP requests and data associated with the HTTP requests. The methods may include monitoring, using a remediation framework, data in a proxy log stored by the proxy server.

The methods may include triggering, using the remediation framework, remedial action. The remedial action may be triggered when the remediation framework determines that a request, such as an HTTP request, and associated data, as stored in the proxy log, satisfies one, two, three, four, five or all of the following conditions: includes an IP address listing a predefined term; is identified as originating from a production server; is associated with an account ID that identifies a service account; is either associated with a user agent that identifies a program or is not associated with any user name; is associated with an identification number that, in a central registry, identifies a production application; and the IP address is tagged as anomalous in response to querying stored information associated with the identification number.

The methods may include the remediation framework monitoring data in the proxy log for satisfaction of the aforementioned condition(s) as described in more detail above. The methods may include the remediation framework assigning weights to an HTTP request based on characteristics of the HTTP request and associated data. The methods may include the remediation framework being triggered to take remedial action when the tallied weight is above a threshold value. Methods for determining weight(s) to assign to an HTTP request include some or all of the methods for determining the first weight, the second weight, the third weight, the fourth weight, the fifth weight, and, in some embodiments, the sixth weight, described above.

The methods may include, in response to the triggering, the remediation framework accessing the production server from which the HTTP request originated. The methods may include, in response to the triggering, the remediation framework querying a directory to identify one or more authorized applications running on the production server.

The methods may include, in response to the triggering, the remediation framework quarantining one or more unauthorized applications running on the production server. The quarantining may include moving each of the identified authorized applications from the production server to a replacement server. After the quarantining, the production server may be altered to be a modified production server.

The methods may include, in response to the triggering, the remediation framework creating a shadow account. The shadow account may be for accumulating third-party data requested by the modified production server. The shadow account may be for accumulating third-party data pushed to the modified production server. The methods may include, in response to the triggering, the remediation framework instructing the proxy server to take remedial action.

The methods may include the proxy server implementing the remedial action. The remedial action may include the proxy server terminating all third-party data transmission to the modified production server. The remedial action may include the proxy server redirecting to the shadow account all received third-party data directed to the modified production server.

The remedial action may include the proxy server, in response to receiving a new HTTP request from the modified production server, forwarding a copy of the HTTP request to the shadow account. The remedial action may include the proxy server executing the new HTTP request. The remedial action may include, when a response to the new HTTP request is received, the proxy server linking the response to the new HTTP request and transmitting the response and the new HTTP request to the shadow account.

Completion, by the proxy server, of the remedial action may truncate functionality of the one or more unauthorized applications running on the modified production server.

The methods may include the proxy server implementing the remedial action by applying a dynamic filter to data the modified production server attempts to transmit to a third-party. The applying the dynamic filter may include the method steps of receiving data from the modified production server for being transmitted to an IP address and filtering the data for sensitive information. When the data is determined to contain sensitive information, the methods may include the proxy server transmitting the data to the shadow account and transmitting instructions to the remediation framework to shut down the modified production server.

The methods may include the proxy server applying the dynamic filter. The methods may include the proxy server receiving data from the modified production server for being transmitted to an IP address. The methods may include the proxy server determining that a size of the data received from the modified production server being greater than a predetermined size.

When the size of the data is determined, by the proxy server, to be greater than a predetermined size, the methods may include the proxy server transmitting the data to the shadow account. When the size of the data is determined, by the proxy server, to be greater than a predetermined size, the methods may include the proxy server transmitting instructions to the remediation framework to shut down the modified production server.

When the size of the data is determined, by the proxy server, to be greater than a predetermined size, the methods may include the proxy server denying all requests, by the modified production server, to transmit data, such as data to the internet.

The methods may include, when the dynamic filter is a first dynamic filter, further comprising implementing remedial action, using the proxy server, by applying a second dynamic filter to third-party data transmitted to the modified production server.

The proxy server may receive data from an IP address for transmission to the modified production server. The applying the second dynamic filter may include, when a size of the data is determined, by the proxy server, to be greater than a predetermined size, transmitting the data to the shadow account. The applying the second dynamic filter may include, when a size of the data is determined, by the proxy server, to be greater than a predetermined size, transmitting the data to the shadow account, transmitting instructions to the remediation framework to shut down the modified production server.

The applying the second dynamic filter may include, when a size of the data is determined, by the proxy server, to be greater than a predetermined size, blocking all data transmission, through the proxy server, such as from the internet, to the modified production server.

The methods may include actions, described above in connection with the system, such as actions described above being executed by the remediation framework and/or the proxy server.

The methods may include filtering the proxy data by the production servers. The methods may include only displaying data sent from and, in some embodiments, received from, a single production server.

The methods may include generating one or more reports. Exemplary reports are illustrated in FIGS. 5-9 of the application.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative system architecture 100. Illustrative system architecture 100 may include Proxy Server 103. Proxy Server 103 may filter requests passing between World Wide Web 101 (aka the 'internet'), Server 107 and Server 117. Proxy Server 103 may maintain Proxy Log 105. Proxy Log 105 may store data relating to requests received by Proxy Server 103. The requests may include HTTP requests.

Remediation Framework 119 may be in communication with Proxy Server 103. Remediation Framework may also be in communication with Server 107 and Server 117.

Registered Application 109 and Registered Application 111 may run on Server 107. Registered Application 113 and Registered Application 115 may run on Server 117. Each of the registered applications may be assigned an identification number. A central registry may store information for each identification number, identifying the registered application, contact personnel of the registered application, and other characteristics of the registered application.

Unregistered Application 121 may be running on Server 107 without a technician/company being aware of its presence. Unregistered Application 123 may be running on Server 117 without a technician/company being aware of its presence. Apparatus and methods provided herein may be used to identify and isolate Unregistered Application 121 and 123 on a company's network.

Figure 2:
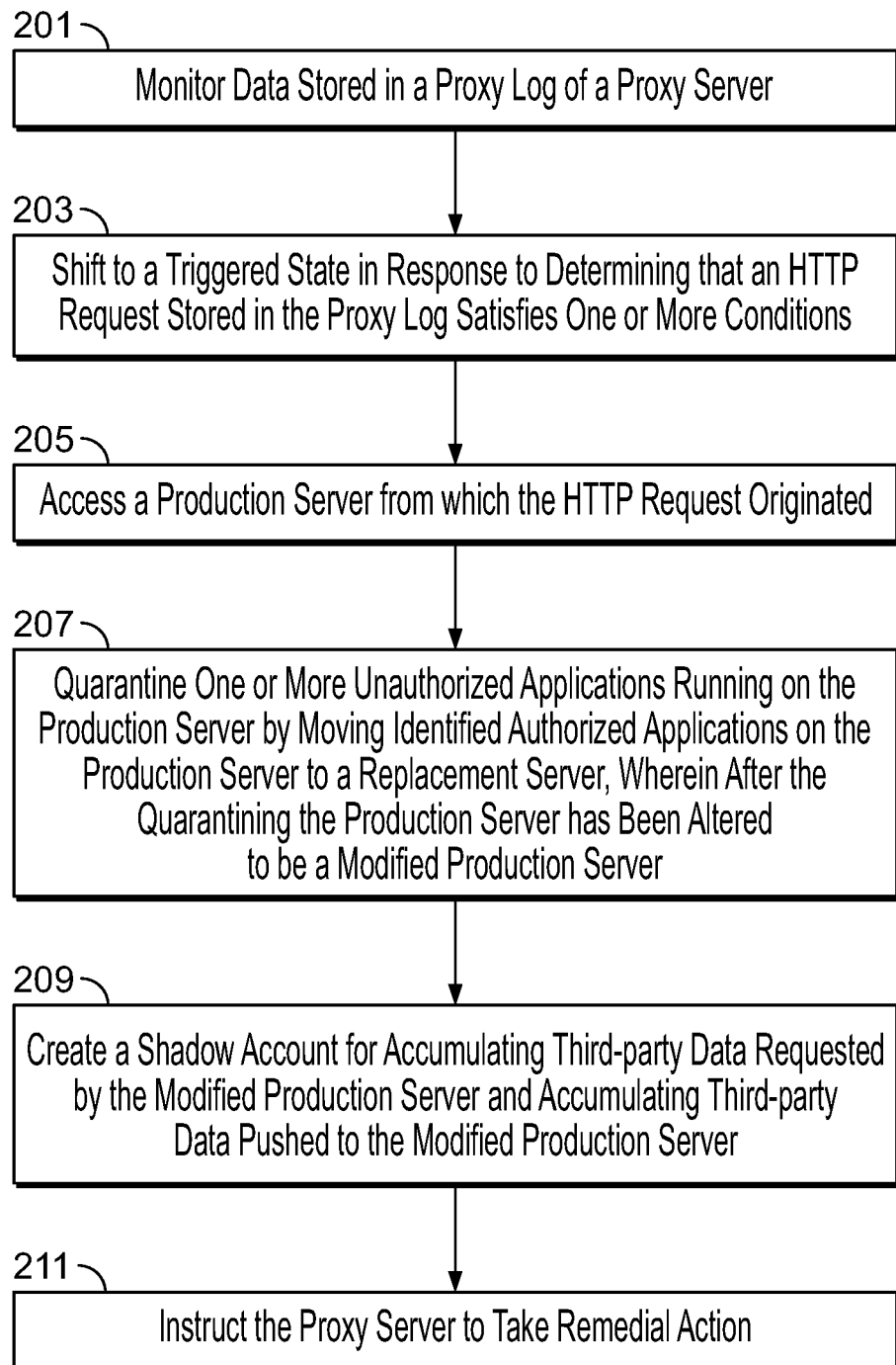
FIG. 2 shows an illustrative method in accordance with principles of the disclosure.

FIG. 2 shows an illustrative method in accordance with the disclosure. The method may be executed by the remediation framework. At step 201, the remediation framework may monitor data stored in a proxy log of a proxy server. At step 203, the remediation framework may shift to a triggered state in response to determining that an HTTP request stored in the proxy log satisfies one or more conditions. The one or more conditions may be conditions described herein.

At step 205, the remediation framework may access a production server from which the HTTP request originated. The remediation framework may identify the production server based on data stored in the proxy log and associated with the HTTP requests. At step 207, the remediation framework may quarantine one or more unauthorized applications running on the production server by moving identified authorized applications on the production server to a replacement server. After the quarantining the production server may be altered to be a modified production server.

At step 209, the remediation framework may create a shadow account for accumulating third-party data requested by the modified production server and accumulating third-party data pushed to the modified production server. The shadow account may be used by a technician to monitor the activity of the unauthorized applications and to aid in identifying the unauthorized applications.

Figure 3:
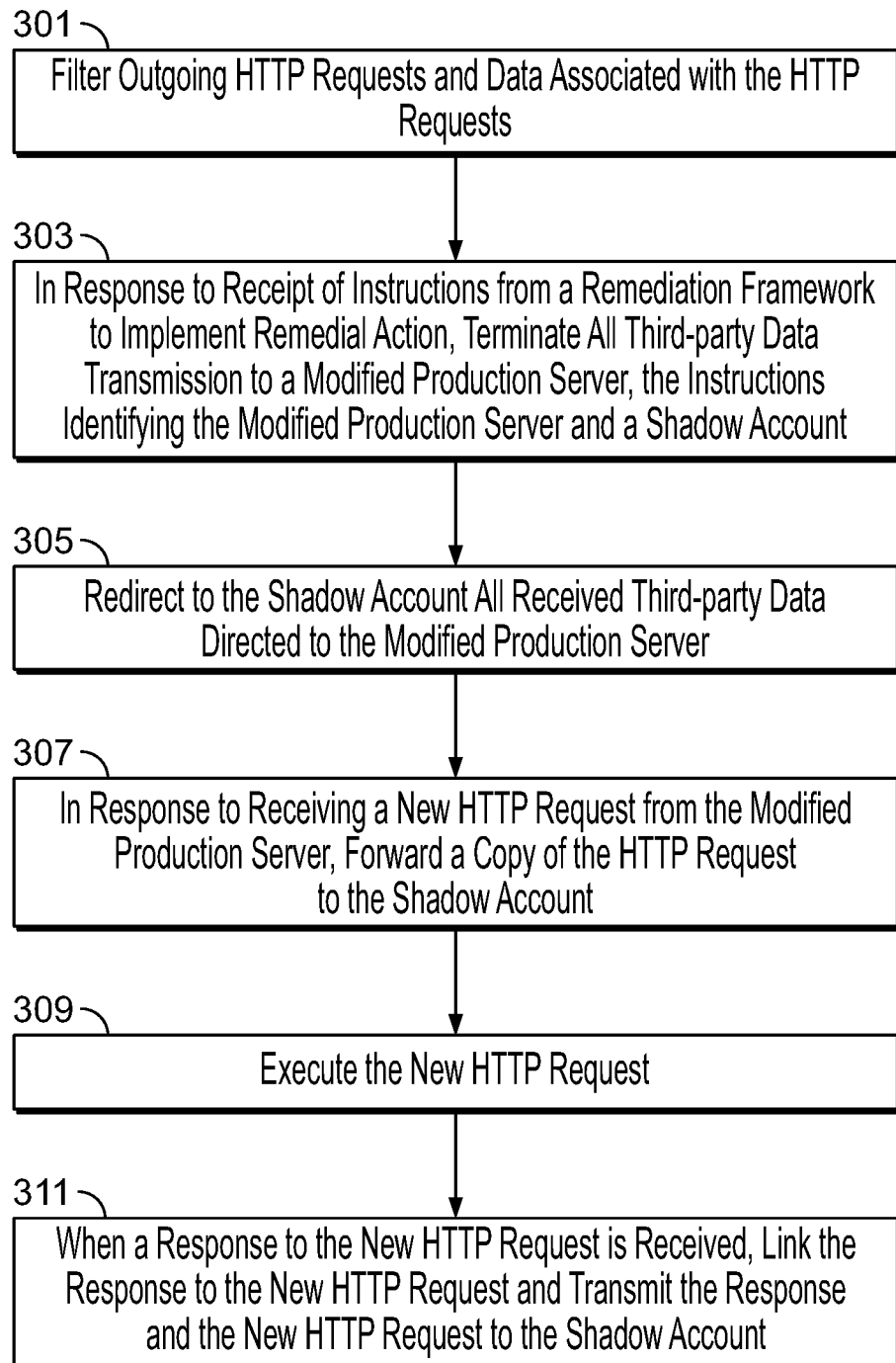
FIG. 3 shows an illustrative method in accordance with principles of the disclosure.

At step 211, the remediation framework may instruct the proxy server to take remedial action. Exemplary remedial action that may be executed by the proxy server is illustrated in FIG. 3. The remedial action instructions transmitted by the remediation framework to the proxy server may include the steps and identifying data required, by the proxy server, to execute the remedial action, such as an identity of the production server and the shadow account.

FIG. 3 shows an illustrative method in accordance with the disclosure. The method may be executed by the proxy server.

At step 301 the proxy server may filter outgoing HTTP requests and data associated with the HTTP requests. At step 303 the proxy server may receive instructions from the remediation framework to implement the remedial action. The instructions may instruct the proxy server to execute steps 303-311. At step 303, in response to receipt of instructions from a remediation framework to implement remedial action, the proxy server may terminate all third-party data transmission to a modified production server.

At step 305 the proxy server may redirect to the shadow account all received third-party data directed to the modified production server. At step 307 the proxy server may, in response to receiving a new HTTP request from the modified production server, forward a copy of the HTTP request to the shadow account. At step 309 the proxy server may execute the new HTTP request. At step 311 the proxy server may, when a response to the new HTTP request is received, link the response to the new HTTP request and transmit the response and the new HTTP request to the shadow account.

Figure 4:
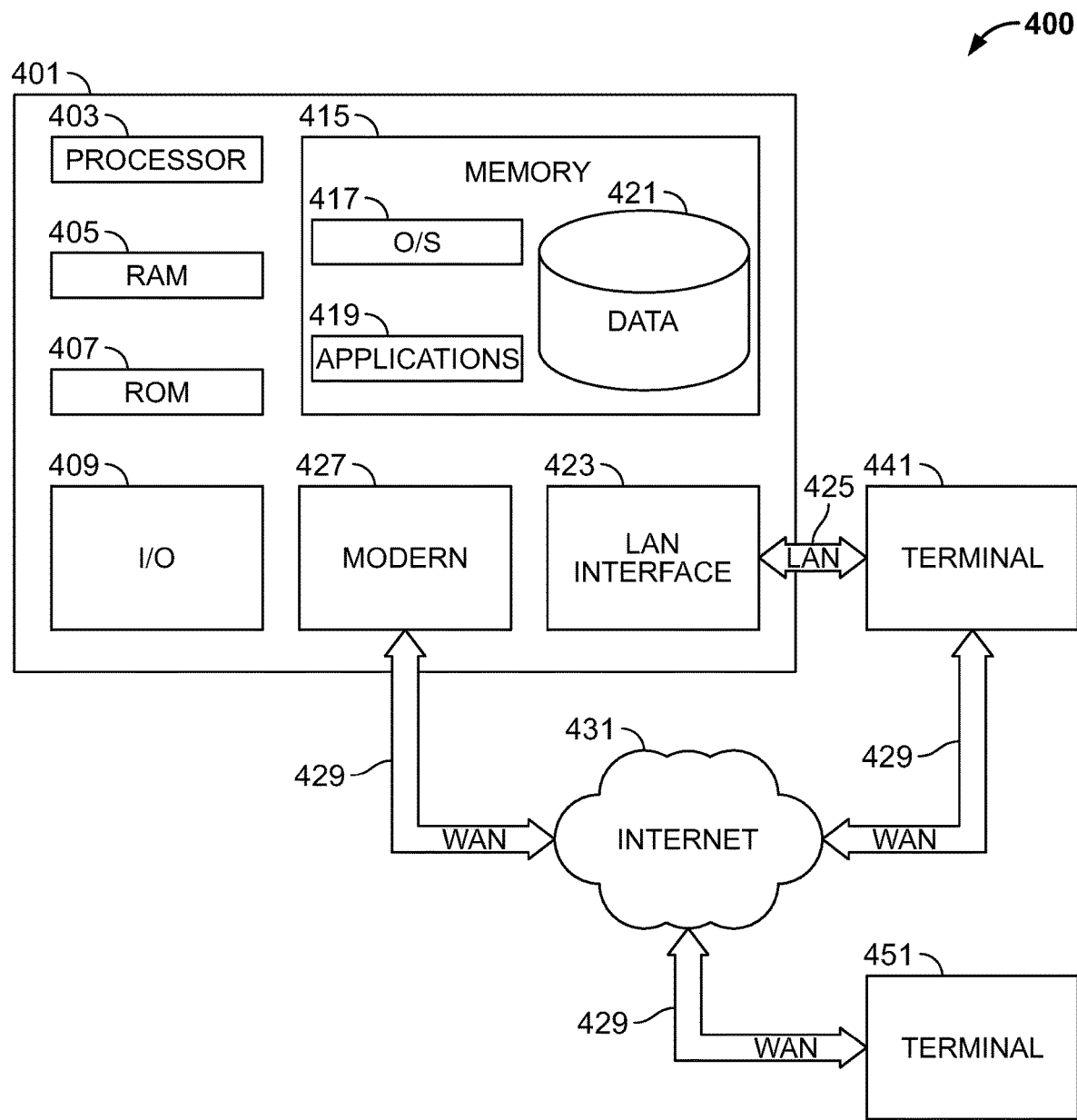
FIG. 4 shows illustrative apparatus in accordance with principles of the disclosure.

FIG. 4 shows illustrative apparatus in accordance with principles of the disclosure. As will be appreciated by one of skill in the art, the invention described herein may be embodied in whole or in part as a method, a data processing system, or a computer program product. Specifically, the proxy server, the remediation framework, the server(s), applications, and the other apparatus described herein may be embodied in whole or in part as a method, a data processing system, or a computer program product. Accordingly, the invention, and one or more of the proxy server, the remediation framework, the server(s), applications, and the other apparatus described herein may take the form of an entirely hardware embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, optical storage devices, magnetic storage devices, flash devices and/or any combination thereof.

FIG. 4 is a block diagram that illustrates computing device 401 that may be used according to an illustrative embodiment of the invention. Specifically, the proxy server, the remediation framework, the server(s), applications, and other apparatus described herein may include some or all of the apparatus described with respect to computing device 401.

Computing device 401 may have a processor 403 for controlling overall operation of the server and its associated components, including RAM 405, ROM 407, input/output module 409, and memory 415. Computing device 401 may include one or more receiver modules, server modules and processors that may be configured to transmit and receive data, such as, for example, HTTP requests, HTTP request information and remediation instructions. Computing device 401 may be configured to transmit and/or receive information and to provide information or commands from/to any suitable system. Additionally, computing device 401 may provide confirmation to mobile devices or terminal 441 and/or terminal 451.

Input/output ("I/O") module 409 may include a microphone, keypad, touch screen, and/or stylus through which a user of computing device 401 may provide input, and may also include one or more speakers for providing audio output and a video display device for providing textual, audiovisual and/or graphical output. The touch screen may also serve as a video display device. The touch screen may respond to "gestures"—e.g. a double tap may open an item and a pinching motion may shrink an item. The touch screen in combination with the video display may be referred to as the "display" of the device.

Software may be stored within memory 415 to provide instructions to processor 403 for enabling computing device 401 to perform various functions. For example, memory 415 may store software used by computing device 401, such as an operating system 417, application programs 419, and an associated database 421. Alternatively, some or all of computing device 401 computer executable instructions may be embodied in hardware or firmware (not shown). Database 421 may provide storage for server information, request information, application information, remediation instructions, and any other suitable information.

Computing device 401 may operate in a networked environment supporting connections to one or more remote computers, such as mobile devices 441 and 451. Mobile devices 441 and 451 may be personal computers or servers that include many or all of the elements described above relative to computing device 401.

The network connections depicted in FIG. 4 include a local area network (LAN) 425 and a wide area network (WAN) 429 but may also include other networks. When used in a LAN networking environment, computing device 401 may be connected to LAN 425 through a network interface or adapter 423. When used in a WAN networking environment, computing device 401 may include a modem 427 or other means for establishing communications over WAN 429 and/or Internet 431. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages. Both computing device 401 and mobile devices 441 and 451 may include networking hardware, networking software or a combination of hardware and software which enables communication over local area network (LAN) 425 and a wide area network (WAN) 429.

Additionally, application program 419, which may be used by computing device 401, may include computer executable instructions for invoking user functionality related to communication, such as email, short message service (SMS), and voice input and speech recognition applications. Computing device 401 and/or mobile devices 441, 451 may also be mobile terminals including various other components, such as a battery, speaker, and antennas (not shown).

Computing device 401, terminal 451 and/or terminal 441 may be portable devices such as a laptop, cell phone, Blackberry™, smartphone, iPad™, iPhone™, Kindle™ or any other suitable device for storing, transmitting and/or transporting relevant information.

Any information described above in connection with database 421, and any other suitable information, may be stored in memory 415.

One or more of applications 419 may include one or more algorithms that may be used to perform one or more of the following: determining whether or not to trigger the remediation framework to perform remedial action, performance, by the remediation framework and/or by the proxy server of remediation action, assigning weights and tallying the weights, and any other method or process described herein.

Figure 5:
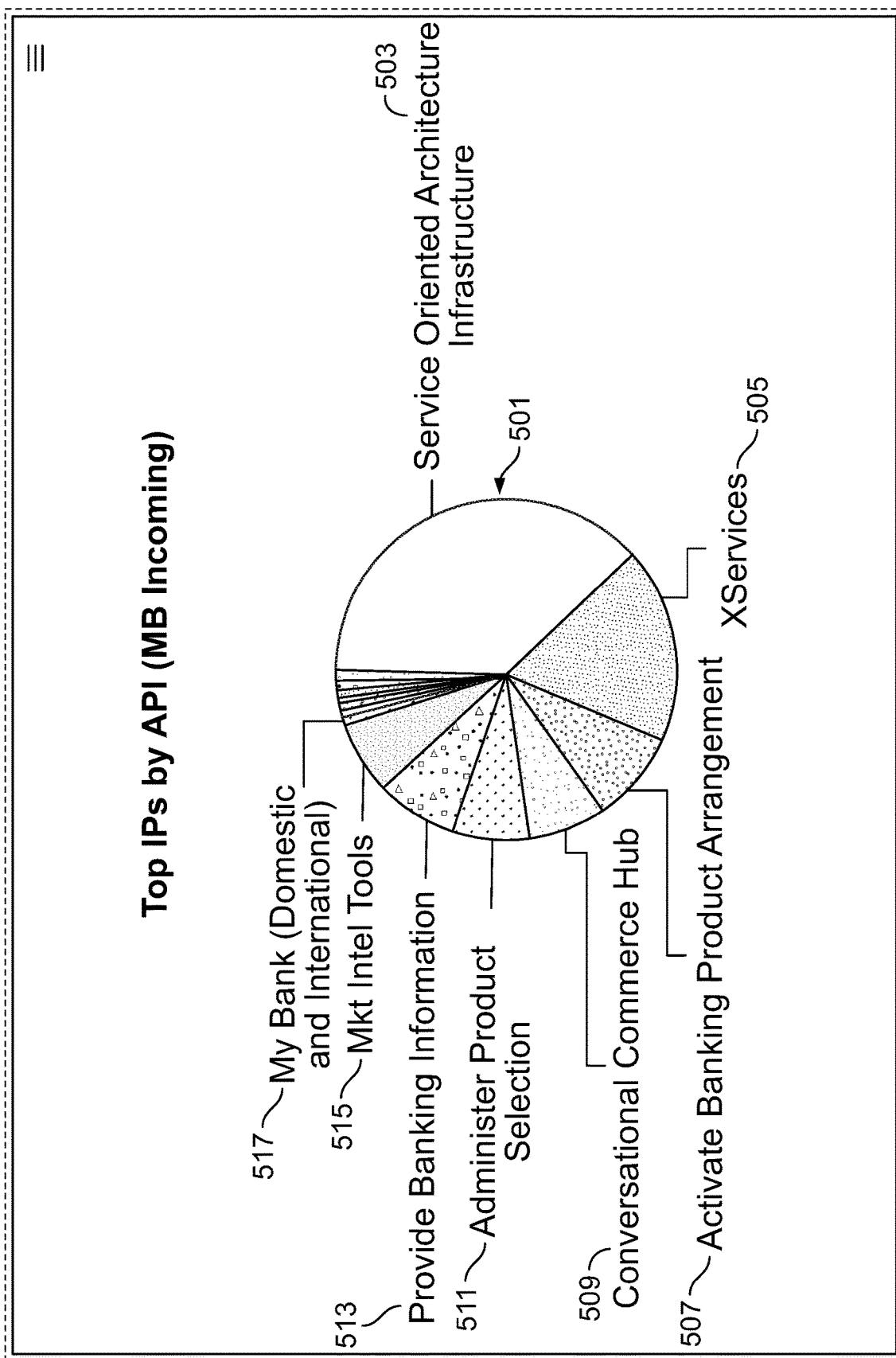
FIG. 5 shows an illustrative graphical user interface in accordance with principles of the disclosure.

FIG. 5 shows an illustrative graphical user interface ("GUI") that may be generated by the proxy server and, in some embodiments, the remediation framework. The illustrative GUI includes pie chart 501 illustrating IP addresses, grouped by APIs, that have generated the most incoming megabytes of data through a system such as a proxy server. The pie chart shows that Service Oriented Architecture Infrastructure 503 has generated the most incoming data, followed, in descending order, by XServices 505, Active Banking Product Arrangement 507, Conversational Commerce Hub 509, Administer Product Selection 511, Provide Banking Information 513, Mkt Intel Tools 515 and My Bank (Domestic and International) 517.

Figure 6:
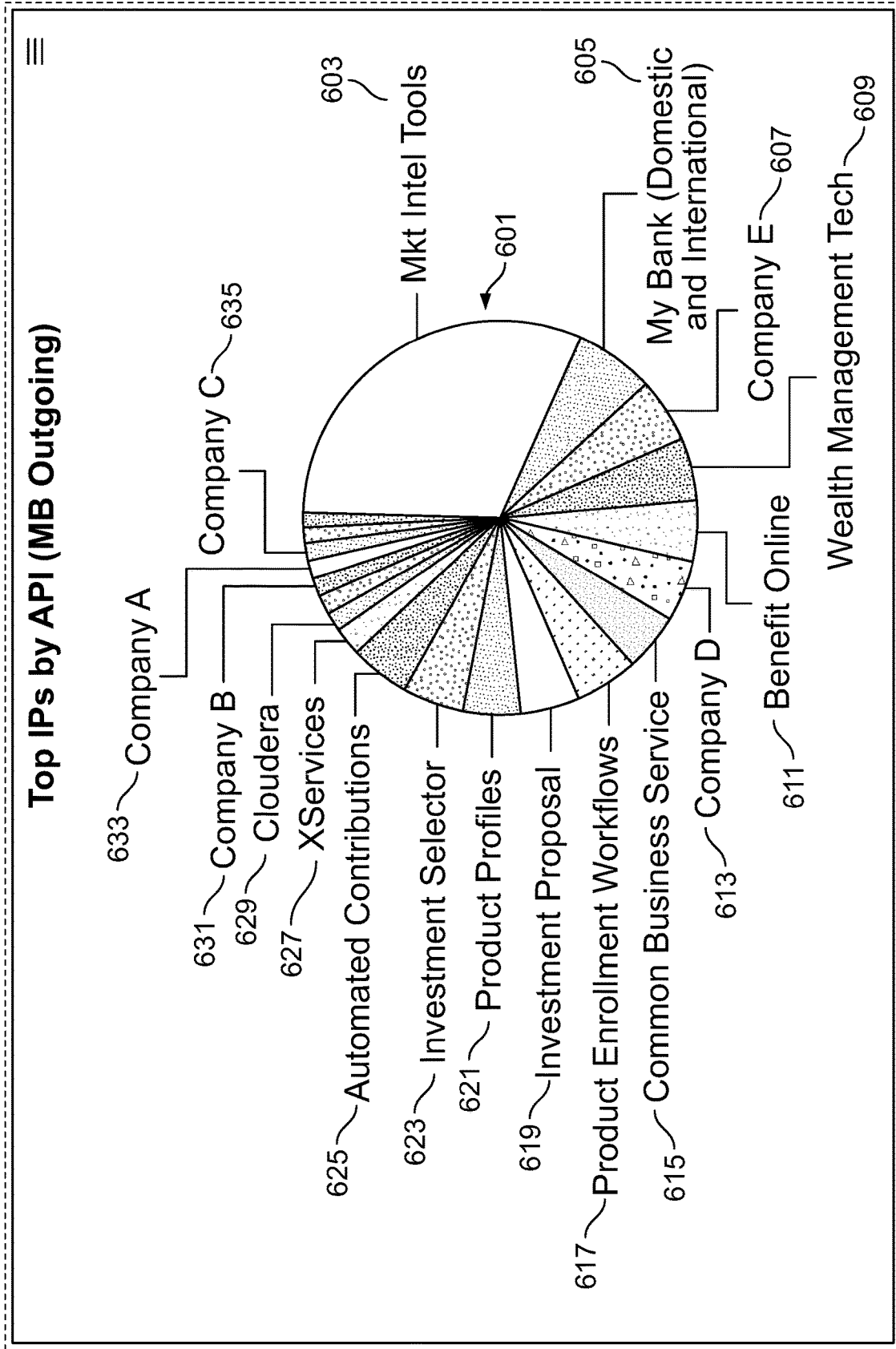
FIG. 6 shows an illustrative graphical user interface in accordance with principles of the disclosure.

FIG. 6 shows an illustrative graphical user interface ("GUI") that may be generated by the proxy server and, in some embodiments, the remediation framework. The illustrative GUI includes pie chart 601 illustrating IP addresses, grouped by APIs, that have generated the most outgoing megabytes of data through a system such as a proxy server. The pie chart shows that Mkt Intel Tools 603 has generated the most outgoing data, followed, in descending order, by My Bank (Domestic and International) 605, Company E 607, Wealth Management Tech 609, Benefit Online 611, Company D 613, Common Business Service 615, Product Enrollment Workflows 617, Investment Proposal 619, Product Profiles 621, Investment Sector 623, Automated Contributions 625, XServices 627, Cloudera 629, Company B 631, Company A 633 and Company C 635.

FIG. 7 shows illustrative GUI 700 in accordance with the disclosure. GUI 700 may display to a user a chart, filtered by Total Bytes in 711, of different URLs 709.

GUI 700 displays 10 entries of applications that were called during a 30-day time period. GUI 700 lists, in descending order, the URLs based on the total megabytes of data that were received from these URLs during the time period. Each URL may be a 'call', referred to alternately herein as an 'HTTP request'. For example, 'api.morningstar, com' may be an illustrative API call. For each URL, GUI 700 lists an identifying number of Host 705 that originated the call to the URL, a Category 707 associated with the URL in the proxy server, URL 709, Total Bytes in 711 and Total Bytes Out 713.

FIG. 8 shows illustrative GUI 800 in accordance with the disclosure. GUI 800 may be displayed to a user after a user selects the URL 'api.morningstar.com' in GUI 700. GUI 800 shows, for each application that called the URL 'api.morningstart.com', Host name 803 identifying a name of a server from which the URL call originated, Score 805, User(s) 807, Usage Comments 811, MB Received 813, Environment 815, MB sent 817, Internal Identification Number 817, and Application Owner 821. Host name 803 may display a server identification number, assigned to the server that is running the application.

For example, GUI 800 shows that Host 209.67.48.4, which is associated with user zs3fy81, received 74.74 megabytes from the URL 'api.morningstar.com' and sent 8.14 MB to the URL 'api.morningstar.com' during the 30-day time period. Host 209.67.48.4 is associated with a production environment and has been assigned Internal Identification Number 70680. John Doe is listed as application owner.

Score 805 may represent a value assigned to the server based on the remediation framework calculating the value for the server. The value may be calculated using the first, second, third, fourth, and fifth weights, where each weight is the value '1'. Here, Host 209.67.48.4 has been assigned the highest tallied score of '5'.

FIG. 8 shows that a server may run one or more authorized applications. Host 209.67.48.4 runs an authorized application associated with internal identification number 70690, but Host 216.35.62.140 runs six authorized applications, the internal identification numbers of the six applications being 23168, 25872, 27814, 38764, 41788 and 94173. A central registry may store information relating to each of the internal identification numbers, and store data relating to the applications associated with each of the identification numbers.

The score may be calculated for each HTTP request generated by a server. The score illustrated in FIG. 8 may be the most recent score assigned to the server for the URL call. In some embodiments, each identical external URL call may be assigned the same value. In some embodiments, the scoring algorithm used to calculate the value may include a metric for a frequency of a call generated by the server. In these embodiments, the score may vary for two or more identical URL calls generated by a server.

Figure 9:
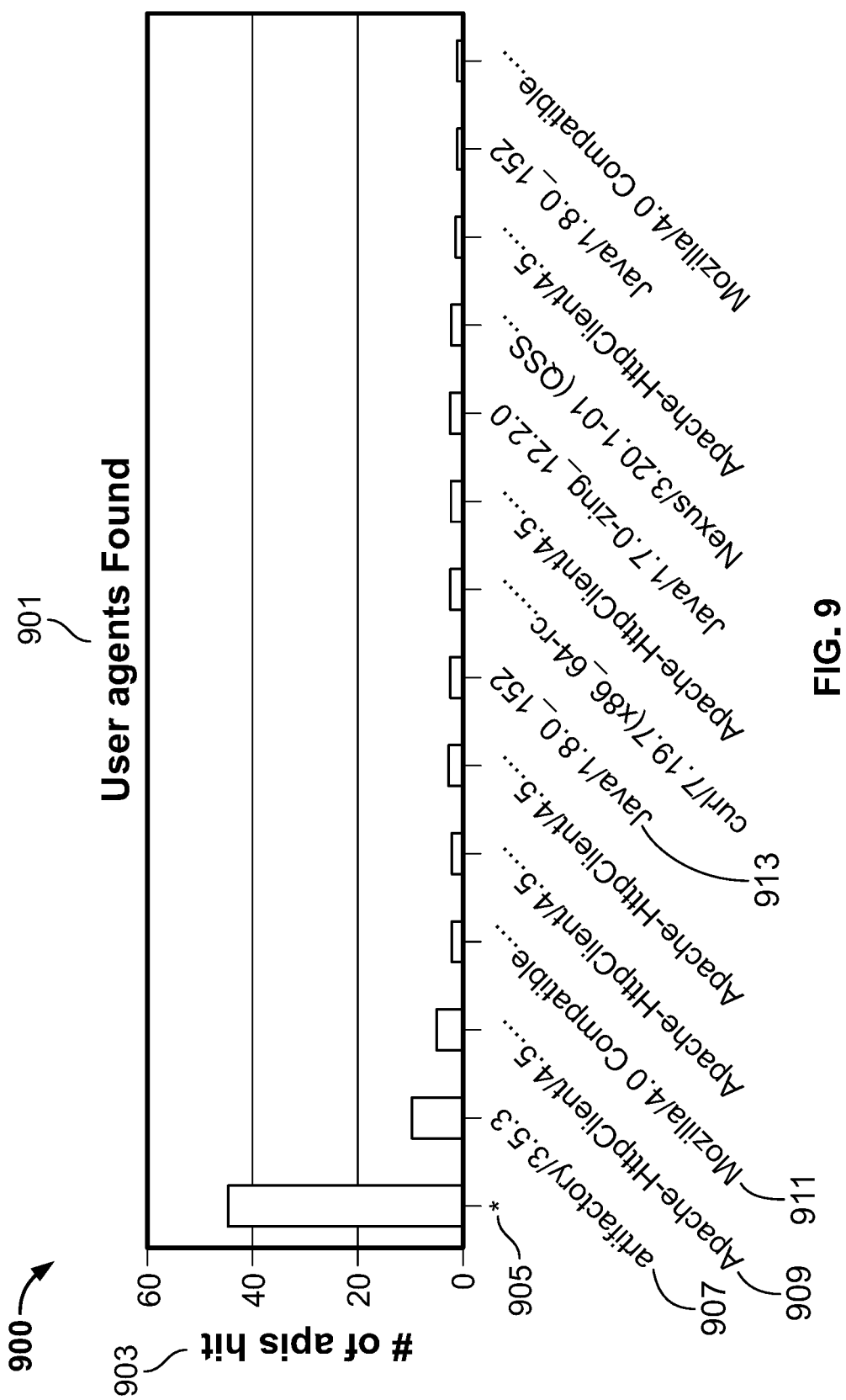
FIG. 9 shows an illustrative graphical user interface in accordance with principles of the disclosure.

FIG. 9 shows illustrative GUI 900 in accordance with the disclosure. GUI 900 illustrates a plurality of user agents that called 'api.morningstar.com' during the 30-days' time period.

The Y-axis of GUI 900 illustrates Number of APIs Hit 903. Number of APIs Hit 903 illustrates a number of calls that each of the agents illustrated in the X-axis executed to call api.morningstar.com. The X-axis lists agents called that 'api.morningstar.com' during the 30-days' time period.

Star 905 shows that the user agent that executed the largest number of calls to 'api.morningstar.com' does not have a user name. This indicates that the user agent associated with Star 905 is most probably an application, not an end user. User agents 911 and 913 are associated with user names that include the names of web browsers ("Mozilla and Java"). Thus, calls generated by User Agents 911 and 913 are likely being generated by an end user. User agent 909's name identifies user agent 909 as most probably being a program.

Thus, methods and apparatus for ISOLATING AND DISABLING UNAUTHORIZED APPLICATIONS are provided. Persons skilled in the art will appreciate that the present invention can be practiced by other than the described embodiments, which are presented for purposes of illustration rather than of limitation, and that the present invention is limited only by the claims that follow.

What is claimed is:

1. A system for quarantining shadow information technology ("IT") comprising one or more unauthorized applications running on a server, the system comprising:
   a content-filtering web proxy server configured to filter outgoing HTTP requests and data associated with the HTTP requests;
   a remediation framework configured to monitor data in a proxy log stored by the proxy server, wherein the remediation framework is triggered to perform remedial action when the remediation framework determines that a HTTP request and associated data, as stored in the proxy log:
      includes an IP address listing a predefined term;
      is identified as originating from a production server;
      is associated with an account ID that identifies a service account;
      is either associated with a user agent that identifies a program or is not associated with any user name;
      is associated with an identification number that, in a central registry, identifies a production application; and
      the IP address is tagged as anomalous in response to querying stored information associated with the identification number;
   the remediation framework, when triggered:
      accesses the production server from which the HTTP request originated;
      queries a directory to identify one or more authorized applications running on the production server;
      quarantines one or more unauthorized applications running on the production server by moving each of the identified authorized applications from the production server to a replacement server, wherein after the quarantining the production server has been altered to be a modified production server;
      creates a shadow account for accumulating third-party data requested by the modified production server and accumulating third-party data pushed to the modified production server; and
      instructs the proxy server to take remedial action; and
   the proxy server is configured to implement the remedial action by:
      terminating all third-party data transmission to the modified production server;
      redirecting to the shadow account all received third-party data directed to the modified production server;

in response to receiving a new HTTP request from the modified production server, forwarding a copy of the HTTP request to the shadow account;
executing the new HTTP request; and
when a response to the new HTTP request is received, linking the response to the new HTTP request and transmitting the response and the new HTTP request to the shadow account;

wherein:
completion, by the proxy server, of the remedial action truncates functionality of the one or more unauthorized applications running on the modified production server.

2. The system of claim 1 wherein the proxy server is further configured to implement the remedial action by applying a dynamic filter to data the modified production server attempts to transmit to a third-party, the applying dynamic filter comprising:
receiving data from the modified production server for being transmitted to an IP address;
filtering the data for sensitive information; and
when the data is determined to contain sensitive information:
transmitting the data to the shadow account; and
transmitting instructions to the remediation framework to shut down the modified production server.

3. The system of claim 2 wherein the dynamic filter further comprises:
receiving data from the modified production server for being transmitted to an IP address; and
if a size of the data is greater than a predetermined size:
transmitting the data to the shadow account; and
transmitting instructions to the remediation framework to shut down the modified production server.

4. The system of claim 3, when the dynamic filter is a first dynamic filter, the proxy server being further configured to implement the remedial action by applying a second dynamic filter to third-party data transmitted to the modified production server, the second dynamic filter including:
receiving data from an IP address for transmission to the modified production server; and
if a size of the data is greater than a predetermined size:
transmitting the data to the shadow account; and
transmitting instructions to the remediation framework to shut down the modified production server.

5. The system of claim 1 wherein the monitoring includes the remediation framework calculating a value for each HTTP request stored in the proxy log, the calculating comprising:
assigning a first weight to each HTTP request if the HTTP request, in the proxy log, requests to access an IP address including a predefined term;
assigning a second weight to each HTTP request if the HTTP request, in the proxy log, is identified as originating from a production server;
assigning a third weight to each HTTP request if the HTTP request, in the proxy log, is associated with an account ID that identifies a service account;
assigning a fourth weight to each HTTP request if the HTTP request, in the proxy log, is either associated with a user agent that identifies a program or is not associated with any user name;
assigning a fifth weight to each HTTP request if the HTTP request, in the proxy log, is associated with an identification number that, in a central registry, identifies a production application; and
tallying the weights assigned to each HTTP request.

6. The system of claim 5 wherein:
when the tallied weight for one of the HTTP requests is above a threshold value, the remediation framework is triggered for the one of the HTTP requests; and
when the tallied weight is below the threshold value, the remediation framework takes no action;
wherein when one of the HTTP requests:
includes an IP address listing a predefined term;
is identified as originating from a production server;
is associated with an account ID that identifies a service account;
is either associated with a user agent that identifies a program or is not associated with any user name; and
is associated with an identification number that, in a central registry, identifies a production application;
then the tallied weight of the one of the HTTP requests is above the threshold value.

7. The system of claim 1 wherein the predefined term is "API".

8. The system of claim 5 wherein the monitoring further includes the remediation framework:
accessing contents of each HTTP request;
for each HTTP request, performing pattern recognition on the contents to identify conformance of the content to one of XML protocol, j son protocol, SOAP protocol, and HTML;
if the contents of one of the HTTP requests conform to one of the XML protocol, the j son protocol or the SOAP protocol, assigning the first weight and a sixth weight to the one of the HTTP requests; and
if the contents of the one of the HTTP requests conform to HTML, not assigning the first weight to the one of the HTTP requests.

9. The system of claim 5 wherein the monitoring further includes the remediation framework:
determining, for each HTTP request in the proxy log, if the HTTP request is associated with an account ID that identifies a web browser; and
not assigning the third weight to one of the HTTP requests when the one of the HTTP requests, in the proxy log, is associated with an account ID that identifies a web browser.

10. The system of claim 5 wherein the monitoring further includes the remediation framework:
determining, for each HTTP request in the proxy log, if the HTTP request is associated with a user agent that identifies a browser; and
not assigning the fourth weight to one of the HTTP requests if the one of the HTTP requests, in the proxy log, is associated with a user agent that identifies a browser.

11. The system of claim 10 wherein the monitoring further includes the remediation framework:
using pattern recognition to determine if each HTTP request in the proxy log is associated with a user agent that conforms to Java™ or C sharp programming protocol; and
assigning the fourth weight to one of the HTTP requests if the one of the HTTP requests, in the proxy log, is associated with a user agent that conforms to Java™ or C sharp programming protocol.

12. The system of claim 5 wherein the monitoring further includes the remediation framework:
aggregating HTTP requests transmitted to an IP address over a time period;
identifying a time lapse between each of the HTTP requests transmitted to the IP address over the time period; and triggering the remediation framework when the time lapse is determined to be a constant value between each of the HTTP requests transmitted to the IP address over the time period.

13. A system for quarantining shadow information technology ("IT") comprising one or more unauthorized applications running on a server, the system comprising:
   a content-filtering web proxy server configured to filter outgoing HTTP requests and data associated with the HTTP requests;
   a remediation framework configured to monitor data in a proxy log stored by the proxy server, wherein the remediation framework is triggered to perform remedial action when the remediation framework determines that a HTTP request and associated data, as stored in the proxy log:
      includes an IP address listing a predefined term;
      is identified as originating from a production server;
      is associated with an account ID that identifies a service account;
      is either associated with a user agent that identifies a program or is not associated with any user name;
      is associated with an identification number that, in a central registry, identifies a production application; and
      the IP address is tagged as anomalous in response to querying stored information associated with the identification number;
   the remediation framework, when triggered, determines if the production server is assigned to a first tier of importance or a second tier of importance;
   when the production server is determined to be assigned to a first tier of importance, the remediation framework is configured to:
      instruct the proxy server to increase monitoring of data being sent to, and received from, the production server;
   when the production server is determined to be assigned to a second tier of importance, the second tier of importance being less than the first tier of importance, the remediation framework is configured to:
      access the production server from which the HTTP request originated;
      query a directory to identify one or more authorized applications running on the production server;
      quarantine one or more unauthorized applications running on the production server by moving each of the identified authorized applications from the production server to a replacement server, wherein after the quarantining the production server has been altered to be a modified production server;
      create a shadow account for accumulating third-party data requested by the modified production server and accumulating third-party data pushed to the modified production server; and
      instruct the proxy server to take remedial action; and
   the proxy server is configured to implement the remedial action by:
      terminating all third-party data transmission to the modified production server;
      redirecting to the shadow account all received third-party data directed to the modified production server;
      in response to receiving a new HTTP request from the modified production server, forwarding a copy of the HTTP request to the shadow account;
      executing the new HTTP request; and
      when a response to the new HTTP request is received, linking the response to the new HTTP request and transmitting the response and the new HTTP request to the shadow account;
   wherein:
      completion, by the proxy server, of the remedial action truncates functionality of the one or more unauthorized applications running on the modified production server.

14. The system of claim 13 wherein:
   the first tier of importance may include a first permitted downtime; and
   the second tier of importance may include a second permitted downtime longer than the first permitted downtime.

15. The system of claim 13 wherein the proxy server is configured to increase monitoring of data being sent to, and received from, the production server in response to receipt of instructions from the remediation framework.

16. The system of claim 13 wherein when the production server is determined to be assigned to the first tier of importance, the remediation framework is further configured to:
   instruct the proxy server to:
      continually monitor a size of outgoing traffic from the production server for a data extrusion event; and
      in response to detection of the data extrusion event, shut down the production server; and
   the proxy server, in response to receipt of the instructions from the production server, is configured to:
      continually monitor the size of outgoing traffic from the production server for the data extrusion event; and
      shut down the production server in response to determining that a size of outgoing traffic is greater than a predetermined threshold, the determination identifying the data extrusion event.

17. A method for quarantining shadow information technology ("IT") comprising one or more unauthorized applications running on a server, the method comprising:
   filtering, using a content-filtering web proxy server, outgoing HTTP requests and data associated with the HTTP requests;
   monitoring, using a remediation framework, data in a proxy log stored by the proxy server;
   triggering, using the remediation framework, remedial action when the remediation framework determines that a HTTP request and associated data, as stored in the proxy log:
      includes an IP address listing a predefined term;
      is identified as originating from a production server;
      is associated with an account ID that identifies a service account;
      is either associated with a user agent that identifies a program or is not associated with any user name;
      is associated with an identification number that, in a central registry, identifies a production application; and
      the IP address is tagged as anomalous in response to querying stored information associated with the identification number;
   in response to the triggering, the remediation framework performing the method steps of:
      accessing the production server from which the HTTP request originated;
      querying a directory to identify one or more authorized applications running on the production server;
      quarantining one or more unauthorized applications running on the production server by moving each of the identified authorized applications from the production server to a replacement server, wherein after the quarantining the production server has been altered to be a modified production server;

creating a shadow account for accumulating third-party data requested by the modified production server and accumulating third-party data pushed to the modified production server; and instructing the proxy server to take remedial action; and implementing the remedial action, the remedial action being implemented by the proxy server performing the method steps of:

terminating all third-party data transmission to the modified production server;

redirecting to the shadow account all received third-party data directed to the modified production server;

in response to receiving a new HTTP request from the modified production server, forwarding a copy of the HTTP request to the shadow account;

executing the new HTTP request; and when a response to the new HTTP request is received, linking the response to the new HTTP request and transmitting the response and the new HTTP request to the shadow account;

wherein:

the completion, by the proxy server, of the method steps performing the remedial action truncates functionality of the one or more unauthorized applications running on the modified production server.

18. The method of claim 17 further comprising the proxy server performing the method steps of implementing the remedial action by applying a dynamic filter to data the modified production server attempts to transmit to a third-party, the applying the dynamic filter comprising the method steps of:

receiving data from the modified production server for being transmitted to an IP address;

filtering the data for sensitive information; and when the data is determined to contain sensitive information:

transmitting the data to the shadow account; and transmitting instructions to the remediation framework to shut down the modified production server.

19. The method of claim 18 wherein the applying the dynamic filter further comprises the method steps of:

receiving data from the modified production server for being transmitted to an IP address; and if a size of the data is greater than a predetermined size:

transmitting the data to the shadow account; and transmitting instructions to the remediation framework to shut down the modified production server.

20. The method of claim 19, when the dynamic filter is a first dynamic filter, further comprising implementing the remedial action, using the proxy server, by applying a second dynamic filter to third-party data transmitted to the modified production server, the applying the second dynamic filter including the method steps of:

receiving data from an IP address for transmission to the modified production server; and if a size of the data is greater than a predetermined size:

transmitting the data to the shadow account; and transmitting instructions to the remediation framework to shut down the modified production server.

* * * * *